United States Patent [19]

Thiel

[11] 4,269,290
[45] May 26, 1981

[54] GUIDING DEVICE FOR BRAKE PAD SUPPORTS OF A SPOT-TYPE DISC BRAKE

[75] Inventor: Rudolf Thiel, Frankfurt am Main, Fed. Rep. of Germany

[73] Assignee: ITT Industries, Inc., New York, N.Y.

[21] Appl. No.: 86,190

[22] Filed: Oct. 17, 1979

[30] Foreign Application Priority Data

Nov. 2, 1978 [DE] Fed. Rep. of Germany ....... 2847655

[51] Int. Cl.³ .............................................. F16D 65/02
[52] U.S. Cl. ................................. 188/72.3; 188/71.8; 188/196 P; 188/216
[58] Field of Search ................. 188/71.8, 196 P, 72.3, 188/216, 73.3

[56] References Cited

U.S. PATENT DOCUMENTS

| | | | |
|---|---|---|---|
| 3,618,714 | 11/1971 | Croswell | 188/196 P X |
| 3,722,637 | 3/1973 | Kershner | 188/196 P |

*Primary Examiner*—Douglas C. Butler
*Attorney, Agent, or Firm*—John T. O'Halloran; Alfred C. Hill

[57] ABSTRACT

The guiding device for brake pad supports of a spot-type disc brake includes a pair of guide pins supported in the caliper housing movable in an axial direction, and a spring clamped between the guide pins and the brake housing with the spring being loaded by the axial movement of the guide pins, when the brake is applied. The spring acts to return the guide pins to their previous position, when the brake is released, in order to achieve a positive retraction of the brake pad guided by the pins.

8 Claims, 3 Drawing Figures

GUIDING DEVICE FOR BRAKE PAD SUPPORTS OF A SPOT-TYPE DISC BRAKE

BACKGROUND OF THE INVENTION

This invention relates to spot-type disc brakes and more particularly to a guiding device for brake pad supports of a spot-type disc brake with at least one pad positioning pin seated in a bore of the brake housing and frictionally engaged with a brake pad support.

In guiding devices of this type, the inactivated position of the brake pad support is determined by its position relative to the pin, which position is adjusted by its frictional connection with the pad positioning pin. The possible return stroke of the pin produces the brake clearance. The return movement of the brake piston is generally brought about by the initial tension of the ring seal on the actuation piston, as soon as the actuation of the piston causing abutting engagement of brake pad with brake disc stops. In order to ensure the return movement of the brake pad away from its engagement with the brake disc at all times, the introduction of return springs has become customary. These springs either act directly on the brake pad or, alternatively, on one or more positioning pins. In the latter case, it has been made sure that, on the one hand, the resilience of the spring is high enough to ensure that the brake pad disengages from the brake disc safely and, on the other hand, not so high as to overcome the frictional connection between the pad positioning pin and the pad support. This is to say that the springs used must be carefully selected as to their characteristics, i.e. they must be manufactured with little dispersion. Return springs acting axially on the pad positioning pin should have a steep characteristic in order to permit a displacement of the pad support by overcoming the frictional connection when the brake pad is worn out. To meet all of these requirements, the return spring must be one with a selected characteristic and extremely close tolerance.

SUMMARY OF THE INVENTION

It is, therefore, an object of this invention to provide a guiding device of the aforementioned type which permits the utilization of components allowing low-cost manufacture while at the same time providing ease of manufacture and maintaining the functional safety.

A feature of the present invention is the provision of a guiding device for brake pad supports of a spot-type disc brake comprising a brake housing; at least one pad positioning pin movable in a guide bore of the housing and frictionally engaging a brake pad support; a bending spring positively connected to the pin and supported in a recess of the housing, the spring being loaded by a brake actuating piston via the support and the pin; and a stop for the pin disposed in the bore to limit the return movement of the support.

The bending spring construction used is of relatively long length and can easily be realized within required tolerances. Simple parts to be punched out of spring plate can be employed for that purpose.

A particularly simple embodiment of the positive connection between pad positioning pin and bending spring will be achieved by providing a circumferential groove in pad positioning pin and by providing that end of the bending spring adjacent the pad positioning pin with a C-shape to positively engage the circumferential groove. This arrangement prevents at the same time the pad positioning pin from dropping out of its boring.

An advantageous improvement includes having the width of the bending spring greater than the diameter of the guiding bore in the brake house for the pad positioning pin which results in a stop for the positioning pin when actuated. In this manner the frictional connection between the pad support and the pad positioning pin can easily be readjusted and the relevant exacting tolerance when manufacturing the bending spring can be neglected.

The movement of the positioning pin can be limited by providing a stop in the form of the blind end of the guide bore adjacent the brake piston, or a stop in the form of a step in the guide bore. The latter alternative allows a simple dismounting of the positioning pin.

Safety and ease of manufacture of the bending spring is provided by forming the bending spring as an oblong leaf-spring, by the bending spring extending in a circumferential direction relative to the brake disc and by the bending spring having two straight ends substantially in the same plane interconnected by a bent intermediate section.

BRIEF DESCRIPTION OF THE DRAWING

Abovementioned and other features and objects of this invention will become more apparent by reference to the following description taken in conjunction with the accompanying drawing, in which.

DESCRIPTION OF THE PREFERRED EMBODIMENT

Figure 1:
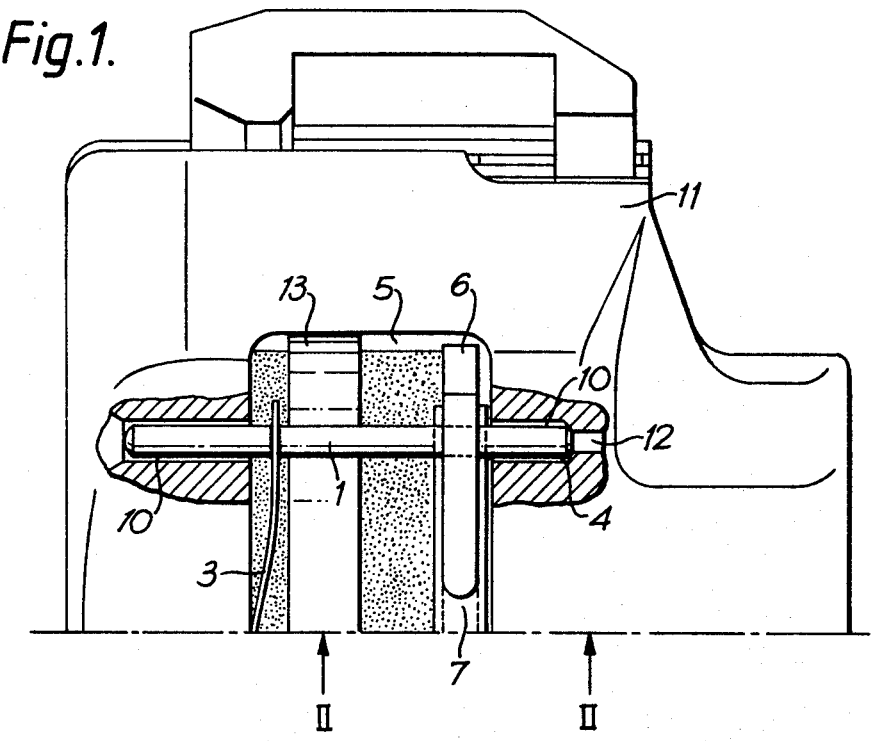
FIG. 1 is a partial view of a spot-type disc brake embodying a guiding device according to the present invention.

FIG. 1 shows a spot-type disc brake of the fist-type caliper version with a guiding device constructed according to the present invention. The fist-type caliper housing 11 embraces the brake disc 13 and the brake pad support or backing plate 6 with the component brake pad bonded or otherwise secured thereto as is well known in the art. The brake piston 8 is received in a bore of the fist-type caliper housing 11 (FIG. 2) and is surrounded by a piston ring seal 9. A pad positioning pin 1 arranged to move axially is received in a guide bore 10 of the fist-type caliper housing 11. The guide bore 10 which is of a diameter corresponding to the pad positioning pin 1 plus a space to move has adjacent to it a bore 12 aligned therewith and being of smaller diameter than bore 10, thereby forming a circumferential shoulder which acts as a stop 4 for the pad positioning pin 1.

Figure 2:
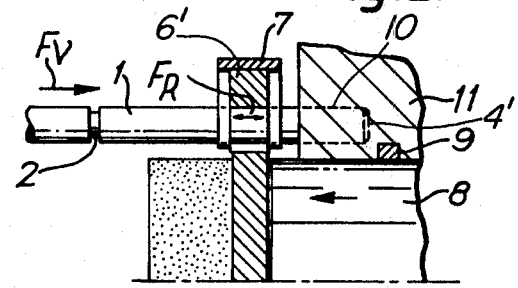
FIG. 2 is a cross sectional view along line II—II of FIG. 1 of the frictional connection between the pad positioning pin and the pad support showing the directions of movement and force.

In FIG. 2, the pad positioning pin 1 is clamped relative to a radially outward eye 6' on the pad support 6 by a spring 7, such that the frictional force $F_R$ thereby built up can be overcome by the brake force when a pad is worn out. As shown in FIG. 2, spring 7 engages the outer edge of eye 6' and pin 1 to hold pin 1 in frictional engagement with support 6. Also in FIG. 2, a modification of stop 4 is illustrated. Bore 10 is illustrated as a blind end bore, with the blind end thereof adjacent piston 8, acting as a stop 4' for pin 1.

Figure 3:
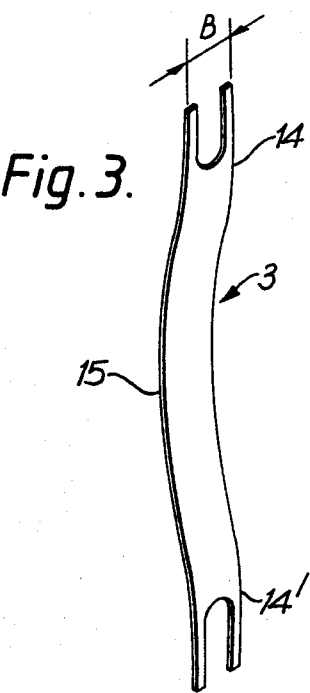
FIG. 3 is a bending spring constructed according to the present invention.

The pad positioning pin 1 includes a circumferential groove 2 (FIG. 2) which engages into the C-shaped end 14 of a bending spring 3 (FIG. 3). The bending spring 3 bears with its intermediate section 15 on a recess 5 of the fist-type caliper housing 11 and effects a defined return force $F_V$ on positioning pin 1. That portion of recess 5 against which section 15 bears is disposed transversely to bore 10 and pin 1. The positioning pin 1 is axially safeguarded aginst falling out of bore 10 by the C-shaped end 14 of bending spring 3 engaging groove 2 and that portion of end 14 extending beyond the positioning pin 1 and the diameter of bore 10, thereby providing a stop for the positioning pin 1 adjacent that end of bore 10 remote from piston 8.

The guiding device disclosed enables a compensation for brake pad wear and, thereby, maintenance of a safe or desired clearance between the brake pad and the brake disc as follows. When the brake pad is worn an excessive amount, the stop provided by end 14 of spring 3 engages recess 5 adjacent bore 10 upon braking and the brake force exerted by piston 8 on support 6 is able to overcome the friction force $F_R$ provided by spring 7 and to displace support 6 to the left relative to pin 1. As soon as the brake force exerted by piston 8 is less than friction force $F_R$, support 6 and pin 1 will again move as a unit due to the friction force $F_R$. The return force $F_V$ generated by the loading of spring 3 will assist the restoring force (roll-back effect) of the piston ring seal 9 and, thus, produce a safe clearance between brake disc and brake pad.

The pad support 6 can be exchanged by disengaging the bending spring 3 from its positive engagement with the positioning pin 1 and then the positioning pin 1 can be disengaged from its frictional engagement with the pad support 6 and the spring 7 by means of a simple pin inserted into the bore 12.

The device is analogously suitable for other brakes of the floating- or fixed-caliper type.

While I have described above the principles of my invention in connection with specific apparatus it is to be clearly understood that this description is made only by way of example and not as a limitation to the scope of my invention as set forth in the objects thereof and in the accompanying claims.

I claim:

1. A guiding device for brake pad supports of a spot-type disc brake comprising:
    a brake housing;
    at least one pad positioning pin movable in a guide bore of said housing and frictionally engaging a brake pad support;
    a bending spring positively connected to said pin and supported in a recess of said housing transverse to said pin, said spring being loaded by a brake actuating piston via said support and said pin; and
    a stop for said pin disposed in said bore to limit the return movement of said support.
2. A device according to claim 1, wherein
    said pin includes
       a circumferential groove, and
    an end of said spring adjacent said pin is C-shaped to positively engage said circumferential groove for positive connection of said spring to said pin.
3. A device according to claim 2, wherein
    the width of said spring is greater than the diameter of said bore.
4. A device according to claims 1, 2 or 3, wherein
    said bore is a blind-end bore the end of which adjacent said piston provides said stop.
5. A device according to claims 1, 2 or 3, wherein
    said bore is a stepped bore adjacent said piston and said step provides said stop.
6. A device according to claims 1, 2 or 3, wherein
    said spring is an oblong leaf-spring.
7. A device according to claims 1, 2 or 3, wherein said spring extends in a parallel relationship with a brake disc disposed adjacent a friction pad carried by said support.
8. A device according to claim 7, wherein
    said spring includes
       two straight end sections extending opposite each other in substantially the same plane, and
       a bent intermediate section interconnecting said end sections.

* * * * *